(12) United States Patent
Youngblood et al.

(10) Patent No.: US 11,697,702 B2
(45) Date of Patent: Jul. 11, 2023

(54) FLAME RETARDANT RESIN

(71) Applicant: Purdue Research Foundation, West Lafayette, IN (US)

(72) Inventors: Jeffrey Paul Youngblood, West Lafayette, IN (US); Matthew Korey, Hamilton, OH (US); John Alan Howarter, West Lafayette, IN (US); Natalie Burgos, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 160 days.

(21) Appl. No.: 17/175,748

(22) Filed: Feb. 15, 2021

(65) Prior Publication Data
US 2021/0324129 A1 Oct. 21, 2021

Related U.S. Application Data

(60) Provisional application No. 63/010,103, filed on Apr. 15, 2020.

(51) Int. Cl.
| | | |
|---|---|---|
| C08F 283/10 | (2006.01) | |
| C08L 63/00 | (2006.01) | |
| C08K 5/134 | (2006.01) | |
| C08G 59/62 | (2006.01) | |

(52) U.S. Cl.
CPC ............ *C08F 283/10* (2013.01); *C08G 59/62* (2013.01); *C08K 5/134* (2013.01); *C08L 63/00* (2013.01); *C08L 2201/02* (2013.01)

(58) Field of Classification Search
None
See application file for complete search history.

(56) References Cited

U.S. PATENT DOCUMENTS

| | | | | |
|---|---|---|---|---|
| 4,560,732 A * | 12/1985 | Kojo | ............... | C09D 163/00 525/481 |
| 2016/0083579 A1* | 3/2016 | Matsuda | ............... | C08L 69/00 264/328.17 |
| 2018/0016445 A1* | 1/2018 | Nagarajan | ............... | C08G 63/81 |
| 2019/0077940 A1* | 3/2019 | Deans | ............... | C08L 55/02 |
| 2020/0010664 A1* | 1/2020 | Youngblood | ............... | C08L 97/02 |
| 2020/0057370 A1 | 2/2020 | Kudo et al. | | |

FOREIGN PATENT DOCUMENTS

| | | | | |
|---|---|---|---|---|
| KR | 20200023027 A | | 3/2020 | |
| WO | WO-2018160520 A1 * | | 9/2018 | ........... C08G 59/245 |

OTHER PUBLICATIONS

International Search Report and Written Opinion, issued by the ISA/US for International Patent Application No. PCT/US2021/018088, pp. 1-10, dated Aug. 5, 2021.
Grigsby, W.J. et al., Esterification of Condensed Tannins and Their Impact on the Properties of Poly(Lactic Acid), Polymers, 5, pp. 344-360, 2013.
Mendis, G.P. et al., Phosphorylated lignin as a halogen-free flame retardant additive for epoxy composites, Green Materials, 4(4), pp. 150-159, 2016.

* cited by examiner

*Primary Examiner* — Christopher M Rodd
(74) *Attorney, Agent, or Firm* — Purdue Research Foundation

(57) ABSTRACT

The present disclosure provides to a novel flame retardant resin, wherein the resin is a reaction product of an epoxy material, a curing agent, and a partially esterified tannic acid of formula I,

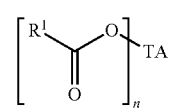

wherein TA represents a tannic acid moiety, $R^1$ represents an optionally substituted $C_1$-$C_6$ straight or branched alkyl, an optionally substituted $C_3$-$C_6$ cyclic ring, an optionally substituted phenyl group, or any combination thereof, and n is 2-10.

9 Claims, 8 Drawing Sheets

FLAME RETARDANT RESIN

GOVERNMENT RIGHTS

This invention was made with government support under Award No. 1144843 and 1333468 awarded by the National Science Foundation (NSF). The government has certain rights in the invention.

CROSS-REFERENCE TO RELATED APPLICATION

This application claims the priority benefit of U.S. Provisional Patent Application Ser. No. 63/010,103, filed Apr. 15, 2020, the content of which is incorporated herein by reference in its entirety.

TECHNICAL FIELD

The present disclosure relates to a novel flame retardant resin, and the method of making and using the novel flame retardant resin. The novel flame retardant resin is a reaction product of an epoxy material, a curing agent, and a partially esterified tannic acid.

BACKGROUND

This section introduces aspects that may help facilitate a better understanding of the disclosure. Accordingly, these statements are to be read in this light and are not to be understood as admissions about what is or is not prior art.

For the past several decades, halogenated flame retardants (HFRs) have been used as additives in a variety of different polymer systems in order for these materials to meet the stringent flame retardant (FR) standards required in the US and UK. HFRs are prevalent throughout the world in a variety of applications including pentabromodiphenyl ether (PentaBDE) in furniture, hexabromocyclododecane (HBCD) in building insulation, and 1,2,3-trichloro-4-(2,3,4-trichlorophenyl)benzene (Aracor) and tetrabromobisphenol A (TBBPA) in the printed circuit boards of electronics. However, more recent research has shown that bioaccumulation of HFRs in humans can lead to lower birth weight and length of children,[5] impair neurological development, and even cause cancer. Furthermore, the health impacts of halogenated flame retardants are felt more strongly in less-wealthy regions of the world where individuals are found to have elevated concentrations of HFRs in breast milk and water. Due to these concerns, there is currently a high demand in industry for alternative chemicals to HFRs in a variety of industries such as automotive, electronics, and construction.

For these reasons, there has been a significant amount of research on biologically based flame retardant additives, such as cellulose, deoxyribonucleic acid, lignins, condensed tannins and tannic acid but these compounds are often limited in application by a solubility mis-match between compounds and hydrophobic polymer systems, such as epoxy. There are several methods that have been used to circumvent this challenge Surfactant can be used to assist dispersion and increase the overall dispersion of the additive, but excess surfactant can affect the resulting thermomechanical properties such a $T_g$—which are of vital importance for most applications. Using solvent has been found to greatly increase dispersion of these additives in polymers, but will also lead to the environmental emission of volatile organic compounds. Chemically modifying the additive to better match the system into which it is being inserted can increase the interfacial compatibility of the additive and the polymer matrix but can potentially make the product more difficult to commercialize due to the added chemical steps in manufacturing. An additional concern with this method is that many of the reactants are synthesized from petroleum, which is a non-renewable resource, and the synthesis pathways can involve toxic compounds.

There is a need for exploration of these and many other processing mechanisms to enable the dispersion of such biologically-sourced molecules into hydrophobic polymer systems. However, there is very limited research in this topic for several bio-based chemicals above, especially TA. TA is a natural polyphenolic compound found in nuts, galls, seeds, and tree bark that is commercially available for purchase at a similar or cheaper cost than commercially available flame retardant additives. TA is a hydrolysable tannin that—when dispersed into polymer matrices—has been found to enhance the thermal properties of plastics. When thermally-activated in the presence of a fire, TA was found to crosslink into the polymer network forming a char barrier between the surface of the material and the propagating flame therefore retarding the spread of the fire. Because of this, TA has been explored as a FR additive in a variety of polymer matrices including poly(lactic acid), nylon 6, polyesters, and urethane foams. TA shows favorability for use as a BFR and PPC alternative compound, but its limited dispersibility in epoxy is the main barrier to its use in this application. Uniform dispersion of high amounts of TA in epoxy has only recently been achieved but demands very high temperature and long timescales.

Although TA shows promise as an environmentally-sourced flame retardant alternative chemical in epoxy systems, researchers have had limited success with it in practice. In order to combat this, researchers have performed chemical functionalization to better match TA to hydrophobic polymer systems and simultaneously increase its flame retardant potential. Previous work identified that surface modification of TA using epoxy resin could increase the compatibility of the molecule; however, the dispersion of up to 8 wt % TA by this method did not increase the flame retardancy of the composite significantly. Additionally, others have used this same chemical reaction between TA and epoxy rings to functionalize the molecule with hydrophobic carbon chains to enhance dispersion, but again flame retardancy was limited. Other researchers have used trans-esterified the molecule to increase its hydrophobicity and flame retardancy in nylon and PLA systems. Even slight degrees of modification of the molecule showed drastic changes in solubility, as slightly-modified molecules were no longer soluble in water. Varying the degree of functionalization from low to high-esterification showed very little change in the compatibility output. Researchers showed that acetylation of TA increased its flame retardancy in nylon and PLA, but no researchers have studied how acetylation of TA affected its flame retardancy in epoxy thermosets.

Therefore, there is an unmet need for developing high effective flame retardant resins.

SUMMARY

The present disclosure relates to a novel flame retardant resin, and the method of making and using the novel flame retardant resin. The novel flame retardant resin is a reaction product of an epoxy material, a curing agent, and a partially esterified tannic acid.

In one embodiment, the present disclosure provides a flame retardant resin, wherein the resin is a reaction product of an epoxy material, a curing agent, and a partially esterified tannic acid of formula I,

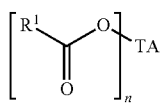

wherein TA represents a tannic acid moiety, $R^1$ represents an optionally substituted $C_1$-$C_6$ straight or branched alkyl, an optionally substituted $C_3$-$C_6$ cyclic ring, an optionally substituted phenyl group, or any combination thereof, n is 2-10; and wherein the partially esterified tannic acid refers to that about 8-40% of free hydroxy groups on the phenolic ring of the tannic acid (TA) are esterified.

DETAILED DESCRIPTION

Figure 1:
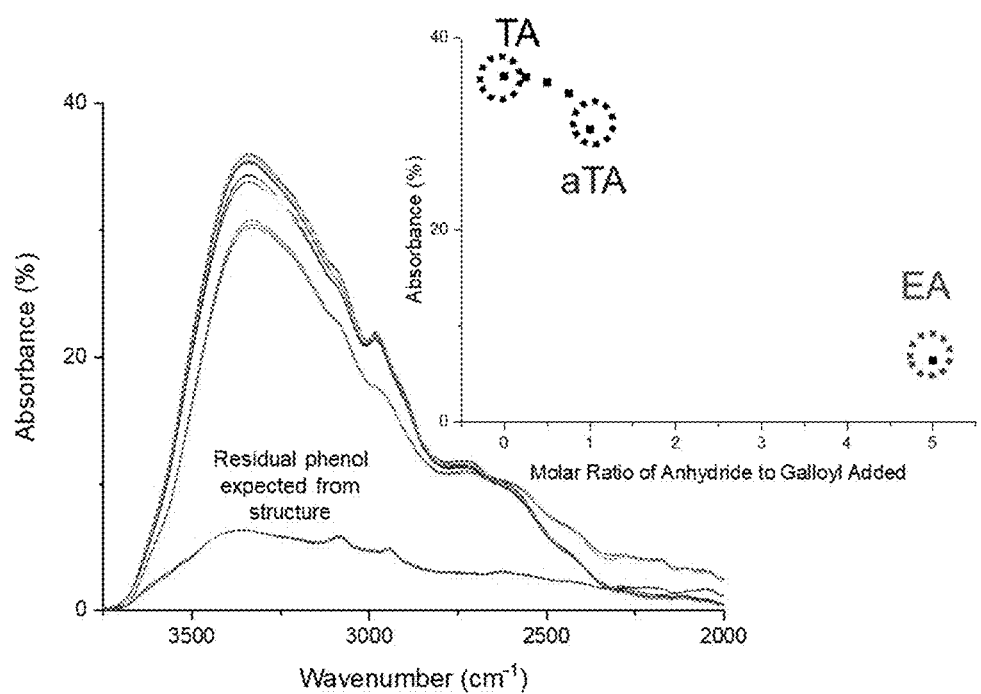
FIG. 1 illustrates FTIR analysis of functionalized TA samples in part a) Phenolic peak on FTIR after normalization to phenyl stretch on TA (1605 cm$^{-1}$). Maximum transmittance of the peak was compared for samples part b) shows a decrease in peak. 3 distinct samples are identified on the curve and labeled as TA, aTA, and EA.

For the purposes of promoting an understanding of the principles of the present disclosure, reference will now be made to embodiments illustrated in drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

The epoxy material referred in this disclosure may be of a resin class containing at least one 1,2-epoxy group. The resin may be, for example, among the general classes commonly referred to as polyethers, polyesters, acrylic, urethane, and the like, which contain the 1,2-epoxy group. Although monoepoxides such as phenyl glycidyl ether, n-butyl glycidyl ether and the like can be utilized, it is preferred that the epoxy material contain more than one 1,2-epoxy group per molecule, as such, it is a polyepoxide. Particularly preferred polyepoxides are polyglycidyl ethers of cyclic polyols, particularly polyphenols such as Diglycidylether Bisphenol A (DGEBA). These polyepoxides may be produced by etherification of a cyclic polyol with epichlorohydrin or dichlorohydrin in the presence of alkali. Examples of cyclic polyols are bis(4-hydroxyphenyl)-2,2-propane, 4,4'-dihydroxybenzophenone, bis(4-hydroxyphenyl)-1,1-isobutane, bis(4-hydroxytertiarybutylphenyl)-2,2-propane, bis(2-hydroxynaphthyl)methane, 1,5-hydroxynaphthalene or the like. Also, polyepoxides similarly produced from epichlorohydrin and novolac-type phenol resins may be employed. An epoxy material may comprise bisphenol A based epoxy material, bisphenol F based epoxy material, cycloaliphatic epoxy material, novolac epoxy material, or any combination thereof.

Of the class of tannins that are useful, herein tannic acid is, presently, the most preferred member. Tannic acid is a lustrous, faintly yellowish, amorphous powder occurring as glistening scales or spongy mass. Other tannins which are envisaged as being useful in the present disclosure (as well as the tannic acid) are extracted from plants and are, generally, named to correspond with the source of extraction, for example, a tannin derived from oak tree is named oak tannin. They are classified as hydrolyzed and condensed tannins. A detailed description of the tannins is provided by Kirk-Othmer Encyclopedia of Chemical Technology, (1954), Vol. 13, pages 578-599. In one embodiment of the present disclosure, the term "tannic acid" by extension is widely applied to any large polyphenolic compound containing sufficient hydroxyls and other suitable groups (such as carboxyls) to form strong complexes with various macromolecules. Tannic acid may also refer to any tannic derivatives such as esters, amides, ethers, carboxylic acids that derive from the natural products or the modification of the naturally obtained tannin materials.

In one aspect, a tannic acid material in the present disclosure refers to any material that has a structure composed of gallic acid unit and terminal phenolic hydroxyl group. In one embodiment, a tannin in the present disclosure refers to any material that has terminal phenolic hydroxyl groups, and the material has a molecular weight between 500-3000 Daltons.

Epoxy resins may be reacted (cross-linked) either with themselves through catalytic homopolymerisation, or with a wide range of co-reactants including polyfunctional amines, acids (and acid anhydrides), phenols, alcohols and thiols (usually called mercaptans). These co-reactants are often referred to as hardeners or curing agents, and the crosslinking reaction is commonly referred to as curing. A curing agent may comprise polyamine, aliphatic amine, polyamide, cycloaliphatic amine, aromatic amine, anhydride, imidazole, Lewis acid, or any combination thereof. Triethylenetetramine (TETA) is used as a representative curing agent in the present disclosure.

The goal of this disclosure was to chemically functionalize TA by performing a trans-esterification of TA using acetic anhydride (AA) and test the ability of this material to improve compatibility and flame retardancy in epoxy. TA was acetylated to different degrees by adding AA at varying molar ratios of acetate group on AA to phenol group on TA. The resulting acetylated TA molecules were dispersed in epoxy at varying weight percentages. The resulting materials were found to have increased flame retardancy as compared to TA control samples which had not been modified. Additionally, the flame retardant ability of the additives was dependent on the degree of acetylation. The results from this work indicate the potential for acetylated TA to be used as a cheap, environmentally-sourced HFR and PPP alternative chemical.

In one embodiment, the present disclosure provides a flame retardant resin, wherein the resin is a reaction product of an epoxy material, a curing agent, and a partially esterified tannic acid of formula I,

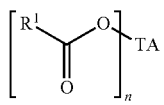

wherein TA represents a tannic acid moiety, $R^1$ represents an optionally substituted $C_1$-$C_6$ straight or branched alkyl, an optionally substituted $C_3$-$C_6$ cyclic ring, an optionally substituted phenyl group, or any combination thereof, n is 2-10; and wherein the partially esterified tannic acid refers to that about 8-40% of free hydroxy groups on the phenolic ring of the tannic acid (TA) are esterified.

In one embodiment of the present disclosure regarding the flame retardant resin, wherein $R^1$ is methyl group or a phenyl group. In one aspect, $R^1$ is methyl group.

In one embodiment of the present disclosure regarding the flame retardant resin, wherein n is 3-8. In one aspect, n is 5-6.

In one embodiment of the present disclosure regarding the flame retardant resin, wherein the epoxy material comprises bisphenol A based epoxy material, bisphenol F based epoxy material, cycloaliphatic epoxy material, novolac epoxy material, or any combination thereof. In one aspect, the epoxy material comprises bisphenol A based epoxy material.

In one embodiment of the present disclosure regarding the flame retardant resin, wherein the curing agent comprise polyamine, aliphatic amine, polyamide, cycloaliphatic amine, aromatic amine, anhydride, imidazole, Lewis acid, or a combination thereof. In one aspect, the curing agent comprises a polyamine. In one aspect the curing agent comprises TETA.

In one embodiment of the present disclosure regarding the flame retardant resin, wherein the partially esterified tannic acid has at least 3 wt % of the total weight of the epoxy material and the partially esterified tannic acid of formula I. In one aspect, the partially esterified tannic acid has about 3-10 wt % of the total weight of the epoxy material and the partially esterified tannic acid of formula I.

In one embodiment, the present disclosure provides a method of using a partially esterified tannic acid in preparing a flame retardant additive, wherein the method comprises:
providing a partially esterified tannic acid of formula I;

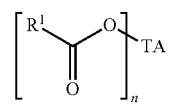

providing an epoxy material;
mixing the partially esterified tannic acid and the epoxy material; and
curing the mixture of the partially esterified tannic acid and the epoxy material with a curing agent to provide a flame retardant resin;

wherein TA represents a tannic acid moiety, $R^1$ represents an optionally substituted $C_1$-$C_6$ straight or branched alkyl, an optionally substituted $C_3$-$C_6$ cyclic ring, an optionally substituted phenyl group, or any combination thereof, n is 2-10; and wherein the partially esterified tannic acid refers to that about 8-40% of free hydroxy groups on the phenolic ring of the tannic acid (TA) are esterified.

Methods

Materials

TA, AA, 1 methyl-imine, and 2-pentanone were purchased from Sigma Aldrich (St. Louis, Mo., USA). EPON 825 (DGEBA) resin was purchased from Hexion, Inc. (Louisville, Ky., USA). Mold Max 60 silicone precursor and initiator (parts A and B) were purchased from Smooth-On, Inc. (Macungie, Pa., USA) GP2074 novolac resin was purchased from Georgia Pacific (Atlanta, Ga., USA). 20 mL borosilicate scintillation vials were purchased from Thermo Fisher Scientific (Waltham, Mass., USA). Poly(tetra fluoroethylene) magnetic stir bars were purchased from Carolina Biological Supply Company (Burlington, N.C., USA). All materials were used as received.

Preparation of Acetylated TA Powders

Acetylation of TA was performed based on a synthesis pathway determined from previous literature. Tannin, acetic anhydride, and 1-methylimidazole (1 wt % on TA) were combined in a 100 mL round bottom flask sealed with a rubber septum. Acetic anhydride was added at varying molar ratios of acetyl groups to galloyl groups (A:G) to ensure differences in chemical modification between powders (Table 1). For this work, the molar weight of TA was assumed to be 1701.1 g/mol as this has been used in previous literature. Additionally, the amount of phenol groups per TA and acetyl groups per AA were assumed to be 25 and 2 respectively.

For this work molar ratios (α) of 0.25, 0.5, 0.75, 1, and 5 were studied. Nitrogen gas was fed into the flask by penetrating the septum with a needle connected to a nitrogen line. Another needle was pierced through to allow for out-flow of the nitrogen gas. The mixture was heated at 65° C. for 4 hours in a nitrogen atmosphere. After reaction, the contents of the vial were added dropwise to a vigorously stirring 500 mL beaker of distilled water containing distilled-water based ice cubes. The suspension was centrifuged and the pH of the supernatant was measured and then the solution was discarded. This process was repeated until the supernatant achieved pH of 4. The powders were dried in vacuum at 40° C.

Composite Positive Mold Preparation for Plaques and Bars

A 3D design of a composite block was created using Fusion 360 to make the necessary silicone molds. A ramp on the side of each mold was included that serves as a starting point when taking silicone out of the mold to prevent ripping the silicone. About ½ inch of space on each side of each positive mold was created, and about ¼ inch on top of the mold was designed to create the bottom for the silicone mold to be generated later. A CAM process in Fusion 360 used to machine all the corners on the composite using a sheet router. An orbital sander was used to sand down the top surface of each plaque or bar using 220 grit sandpaper. This allowed silicone to separate from the composite positive mold more easily, and the epoxy to separate more easily from the silicone negative mold later. The mold was sprayed with air to remove any unwanted composite dust.

Epoxy Sample Preparation

Silicone molds were prepared by machining composite "master" blocks and casting Mold Max-60 Silicone Rubber Compound (Smooth-On, Inc.) around the block with subsequent demolding. to create the mold cavity. The silicone mold was allowed to cure for at least 12 hours at room temperature before use. The silicone negative molds for each batch of epoxy were prepared by spraying with mold release (Stoner E-206 Silicone Mold Release), heating for five minutes at 80° C. then spraying again. The TA powders were added to EPON 825 resin and mechanically mixed using a Flacktek mixer (SpeedMixer, Landrum, S.C., USA) for several minutes at 1250 rpm. After mixing, TETA was added in a ratio of 14 parts per 100 parts EPON 825. The resulting mixture was then mechanically mixed for several additional minutes at 1250 rpm to properly disperse TETA into the solution. The solutions were then poured into the silicone molds and put in a vacuum chamber to remove residual bubbles from pouring and mixing. The result was set overnight at room temperature. The following day, samples were removed from silicone molds and put into an oven at room temperature where they were then heated at 5° C./min to 100° C. for 2 hours to cure and then heated at a 5° C./min rate to 1250 to be post-cured for 2 additional hours.

Epoxy Sample Characterization

Optical Microscopy was performed using a Zeiss optical microscope (Zeiss, Thornwood, N.Y., USA). Samples were prepared by pouring 5 mL of sample onto a microscope slide. Spacers were used on either side of the sample to ensure consistent sample thickness and a microscope slide was placed on top. Image analysis was done using ImageJ (National Institute of Health, Bethesda, Md., USA).

Attenuated total reflectance (ATR) Fourier transform infrared (FTIR) spectroscopy was performed using a PerkinElmer Spectrum 100 FTIR Spectrometer (PerkinElmer, Seer Green, Beaconsfield, UK) outfitted using a zinc selenide (ZnSe) crystal. Samples were scanned from 650 $cm^{-1}$ to 4000 $cm^{-1}$ in transmissive model. Epoxy samples of thickness 0.35 cm containing the powders as additives at 10 wt % and peaks were normalized to a control epoxy sample. These samples were not cured as above but were instead set at room temperature to avoid reaction between TA and epoxy resin. Samples were scanned 4 times and normalized to the phenyl peak at 1605 $cm^{-1}$ using Spectra (PerkinElmer, Seer Green, Beaconsfield, UK). Three samples were analyzed for each powder. Absorbance values were calculated using Spectra (PerkinElmer, Seer Green, Beaconsfield, UK) and were averaged between samples.

Ultraviolet-visible (UV/Vis) spectroscopy was performed using a Lambda 950 UV-VIS-NIR spectrophotometer (PerkinElmer, Waltham, Mass., USA). Three samples at each concentration were prepared in acrylic cuvettes. All absorbance values were normalized to an empty cuvette. Transmission was measured for all wavelengths between 200-800 nm to measure the full visible light spectrum. Transmission curves were analyzed using OriginPro 2019 (OriginLab, Northampton, Mass., USA). A UV-flashlight was also used to help characterize samples. An Optimax 365 UV-LED flashlight (Spectroline, Westbury, N.Y., USA) was pointed at the samples. The photo was taken using a PowerShot A70 Camera (Canon, Woodridge, Ill.).

Thermogravimetric analysis (TGA) was performed with a Q50 thermogravimetric analyzer (TA Instruments, Newcastle, Del., USA). Samples were prepared for TGA analysis by shaving off 15±2.3 mg of sample from epoxy products. Experiments were performed in nitrogen with a 60 mL/min flow rate using a 20° C./min heating rate from 30° C. to 900° C. Three epoxy samples were run at each concentration and results were averaged. $T_d$ was determined by finding the peak of the mass loss rate curve using Universal Analysis (TA Instruments, Newcastle, Del., USA) and averaging the temperature values at this point. Remaining char values were calculated by measuring the weight fraction of the sample using Universal Analysis (TA Instruments, Newcastle, Del., USA) at the completion of the TGA test (800° C.) and then averaging the weight fraction values at this point.

Differential Scanning Calorimetry (DSC) was performed on liquid pre-polymer samples using a Q2000 Differential Scanning Calorimeter (TA Instruments, Newcastle, Del., USA). Samples of 12±1.2 mg were loaded into aluminum pans and measured using a heat/cool/heat cycle from −75° C. to 200° C. with a heating and cooling rate of 25° C./min. Three samples were measured at each concentration and the mean glass transition value of the second heat curve was calculated as the midpoint of the incline observed on thermograms and averaged for each concentration using Universal Analysis (TA Instruments, Newcastle, Del., USA).

Dynamic Mechanical Analysis (DMA) was performed on all samples using Q800 Dynamic Mechanical Analyzer (TA Instruments, Newcastle, Del., USA). Samples were prepared of dimensions 5.5 cm×1.2 cm×0.35 cm by pouring prepared solutions into silicone molds and then cured. Samples were polished to remove remaining silicone from their surfaces. A dual cantilever mechanical test was performed at a frequency of 1 Hz and displacement of 0.15 μm. Temperature was held constant at 30° C. and the storage modulus was measured for 20 minutes. Three samples were measured at each TA concentration and were averaged. E' values were calculated by averaging the datapoints for all samples of the same wt %. TA using Universal Analysis (TA Instruments, Newcastle, Del., USA).

Mechanical testing was performed using a compression fixture on a mechanical testing frame (MTS Instruments, Eden Prairie, Minn., USA). Cylindrical samples were prepared with dimensions of 24.2±1.3 mm×30.1±4.8 mm being diameter and height respectively. Five samples were measured at each concentration and they were loaded to break, which was determined by observable cracking and fracture on the surface of the part. Toughness values were obtained by integrating the stress/strain curves using OriginPro 2017 (OriginLab Inc., Northampton, Mass., USA).

Mass loss calorimetry (MLC) was performed using an MLC 2004 mass loss calorimeter (Fire Testing Technologies, East Grinstead, UK) which was modified with a chimney and additional thermopiles. Poly(methyl methacrylate), polystyrene, and ethylene glycol standards were used to calibrate the instrument. The heat source was set at 35 kW/m² and remained constant for the duration of the test. A spark igniter was used to ignite the samples. The test was concluded when the mass loss rate was less than 2.5 g/min. Five specimens were analyzed for each composition and were prepared according to ASTM E 2102-15. Mass loss curves were analyzed using OriginPro software.

Statistical analysis was performed using JMP (SAS Institute, Cary, N.C., USA). A student's t-test was run to compare samples. A p-value <0.05 was used to indicate statistically significant differences between samples. Regression analysis was performed using OriginPro 2017 (OriginLab Inc., Northampton, Mass., USA). Results were fit to an exponential decay and linear models, and the reported equations and standard error ($S_e$) values were output by the software after regression analysis. $S_e$ values <0.05 were determined as appropriate fits for the regression.

Results and Discussion

Preparation of Flame Retardant Additives

Acetylation of TA was performed by using procedure developed by previous researchers. The synthesis pathway can be found in Scheme 1.

Scheme 1: Reaction scheme for the reaction of TA and AA

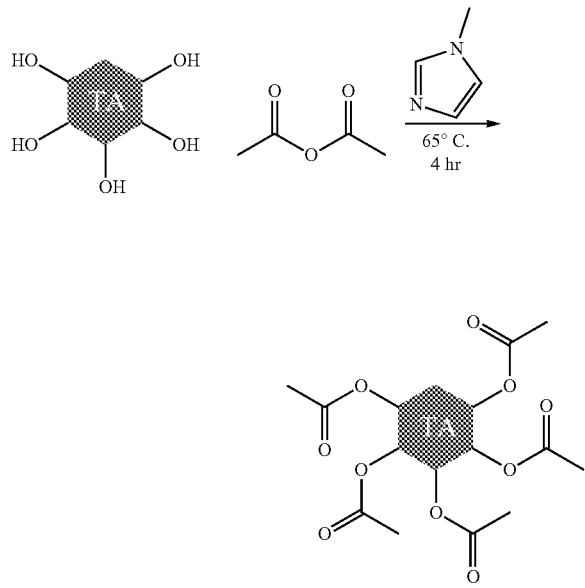

Note:
TA structure simplified

Reaction yields were calculated and are listed (Table 1). The resulting compatibility changes after chemical modification were not found to significantly change with small molar fractions. Much of the reaction products in the 0.25-1 samples were washed away during the cleaning procedure due to an insignificant change in compatibility in the reaction product. This reaction yield was observed in all samples except the excess anhydride (5) sample which had a significantly increased reaction yield as compared to the other samples. These samples during the washing procedure were largely found to precipitate out, whereas a significantly reduced amount of solid precipitated out in the smaller molar fraction samples.

TABLE 1

Yields of the reactions between TA and AA

| Molar Fraction (acetyl/galloyl) | Acetic Anhydride Added (grams AA/grams TA) | Reaction Yield (%) |
|---|---|---|
| 0.25 | 0.189 | 10.2 ± 6.1 |
| 0.5 | 0.378 | 17.5 ± 10.1 |
| 0.75 | 0.568 | 15.3 ± 9.2 |
| 1 | 0.757 | 25.2 ± 4.3 |
| 5 | 3.78 | 84.4 ± 8.1 |

Reaction products were then characterized using FTIR analysis (FIG. 1)

Results from FTIR analysis suggest that the degree of functionality was not fully dependent on the ratio of the additives, which was consistent with previous literature. At a 1:1 molar ratio of A:G, it was expected to achieve maximum functionalization. However, the addition of excess anhydride resulted in a reduction of the phenol peak of TA past this point, as evidenced in FIG. 1 by the 5:1 sample. The significant reduction in the phenol peak was attributed in this analysis to the addition of acetic anhydride to the outer groups of the "surface" of the molecule and is expected from the chemical synthesis pathway. The FTIR results suggest that the degree of functionality is significantly different in the control, 1, and 5 samples which were labeled TA, aTA, and EA for the purpose of this work. For this reason, further exploration of flame retardancy and material properties were studied for these 3 levels of functionalization of the molecule.

Figure 2:
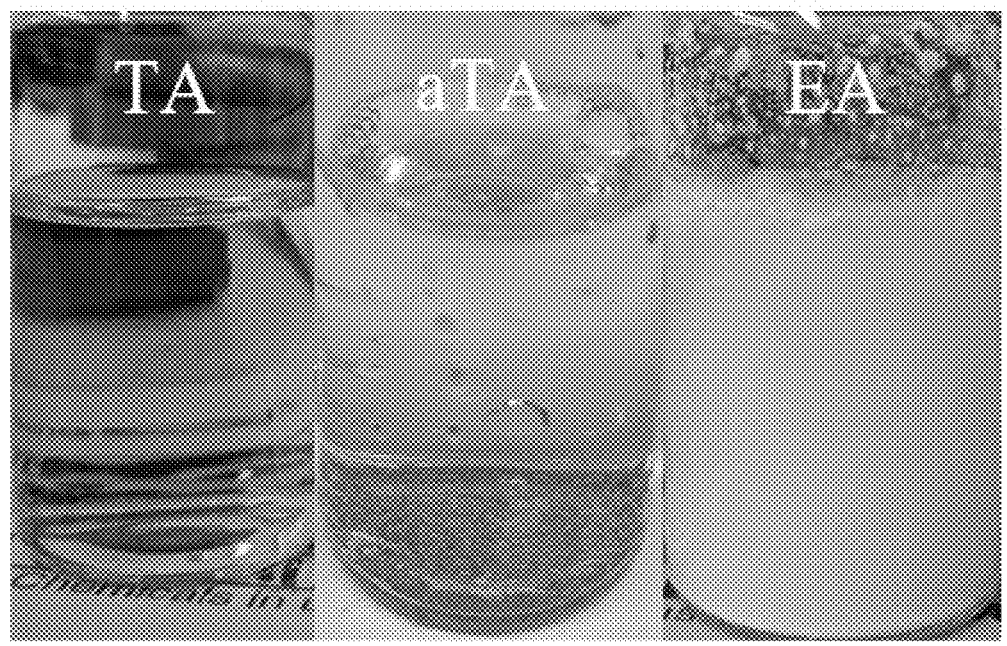
FIG. 2 illustrates TA, aTA and EA powders dispersed in water. Photos show TA dissolved, aTA partly dissolved but also precipitated, and EA did not dissolve into solution but suspended.

After chemical modification, there was a difference in the appearance of the powders, as TA samples were a tanned color, aTA powders were a light tan, and EA powders were white. Water compatibility measurements were performed to further indicate the changes in chemical structure to TA (FIG. 2). TA samples were found to dissolve in water. However, aTA samples slightly dispersed in the water as evidenced by the slightly browned solution color in this case. The majority of the powder precipitated from solution and aggregated at the bottom of the vial. EA samples showed visible changes in compatibility with water as compared to TA powders but additionally remained suspended.

The result from FTIR, water solubility, and TGA indicate that the 3 TA samples have distinct chemical functionalities. FTIR peaks indicate that the aTA and EA samples were surface functionalized, as evidenced by the decrease in the magnitude of the phenol peak. Water solubility indicated that the more acetic anhydride that was added to the samples, the more hydrophobic, on average, the samples became. TGA indicated a distinct and unique pathway for each powder with increased thermal stability in the aTA and EA samples, with EA samples having the highest thermal stability. The TGA results also indicate that the degradation pathway of the TA molecule is largely led by the degradation of the phenol groups on the surface of the molecule. However, aTA and EA samples showed that while there was evidence of some residual phenol groups in each sample, the magnitude of this peak decreased as compared to the internal TA structure, further suggesting degree of modification differences between these samples. The bulk of thermal degradation occurred at the temperature associated with the degradation of the internal TA structure in both aTA and EA samples. The result of this section of the work is that it is suggested that this chemical synthesis pathway does in fact functionalize TA with acetic anhydride. A more hydrophobic structure is created, and the degree of hydrophobicity of the molecule is tunable based on the molar ratio of the anhydride group on acetic anhydride to the galloyl group on TA. The addition of acetyl groups to the surface of TA additionally makes the molecule's degradation pathway change resulting in a material with a higher char yield and, in the case of EA samples, a significantly increased temperature of thermal degradation.

Figure 3:
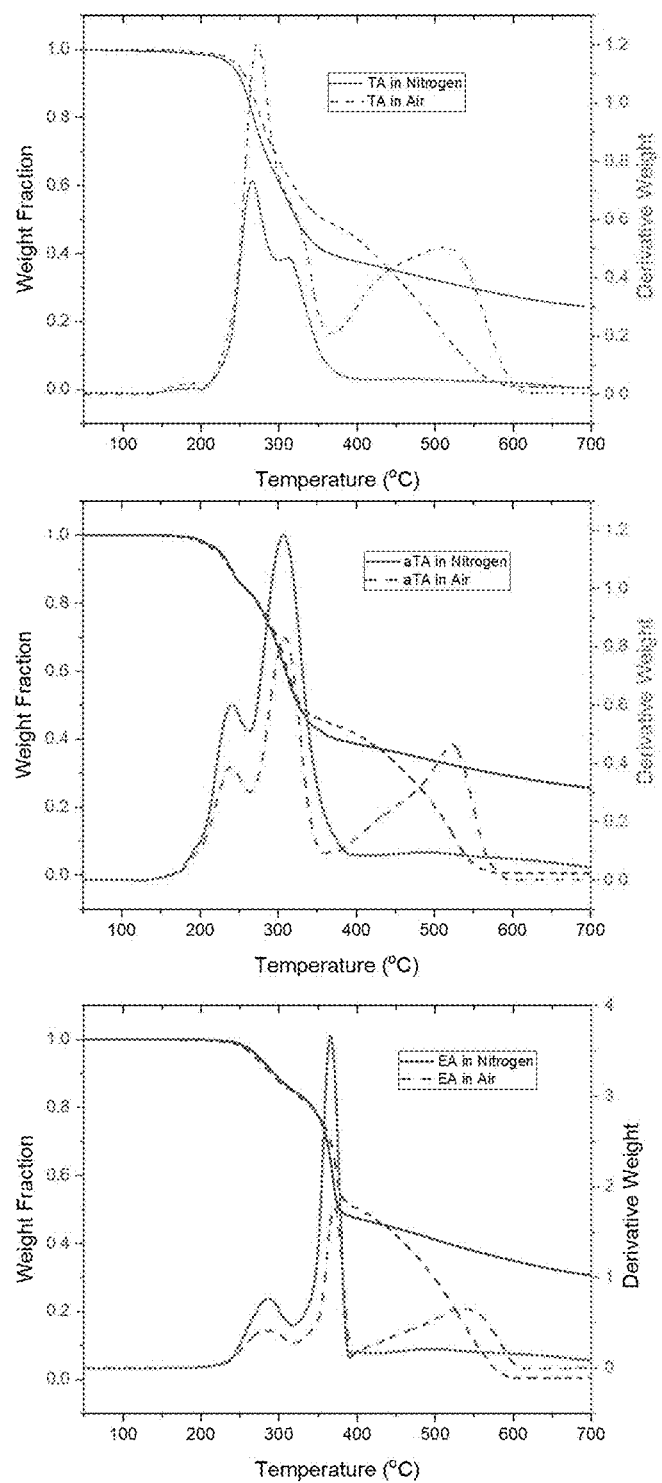
FIG. 3 illustrates TGA of a) TA, b) aTA, and c) EA powders. Results indicate that aTA and EA powders had increased thermal stability as compared to control samples.

This result is not surprising as the addition of acetyl groups to TA has been shown to have this effect. We believe the preliminary explanation of this behavior is that the outermost acetyl groups on aTA and EA are less thermally stable than the internal TA structure, as evidenced by TGA (FIG. 3). The breakage of this phenyl ester bond on the acetylated TA results in an increase in the ability of the powder to char resulting in an observable increase in the thermal stability of the material as compared to the control TA sample, which would break the phenol/galloyl bond on the molecule. Partial acetylation of the molecule leaves phenolic hydroxyls available for degradation. The phenol groups do not form a char that is more thermally stable than the control sample, and thus there is no increase in the thermal stability of the char, though there is an observable decrease in the magnitude of the phenol degradation peak on TGA which is a result of fewer free phenolic hydroxyls due to functionalization. The addition of the phenyl ester increases the magnitude of the char yield by delaying phenol degradation and the more phenyl ester that is added to the molecule, the more thermally stable the powder is. Thus, tacetylated of TA shows promise as a flame retardant additive due to the increase in thermal stability of the resultant molecule.

Measuring Compatibility of Samples

Figure 4:
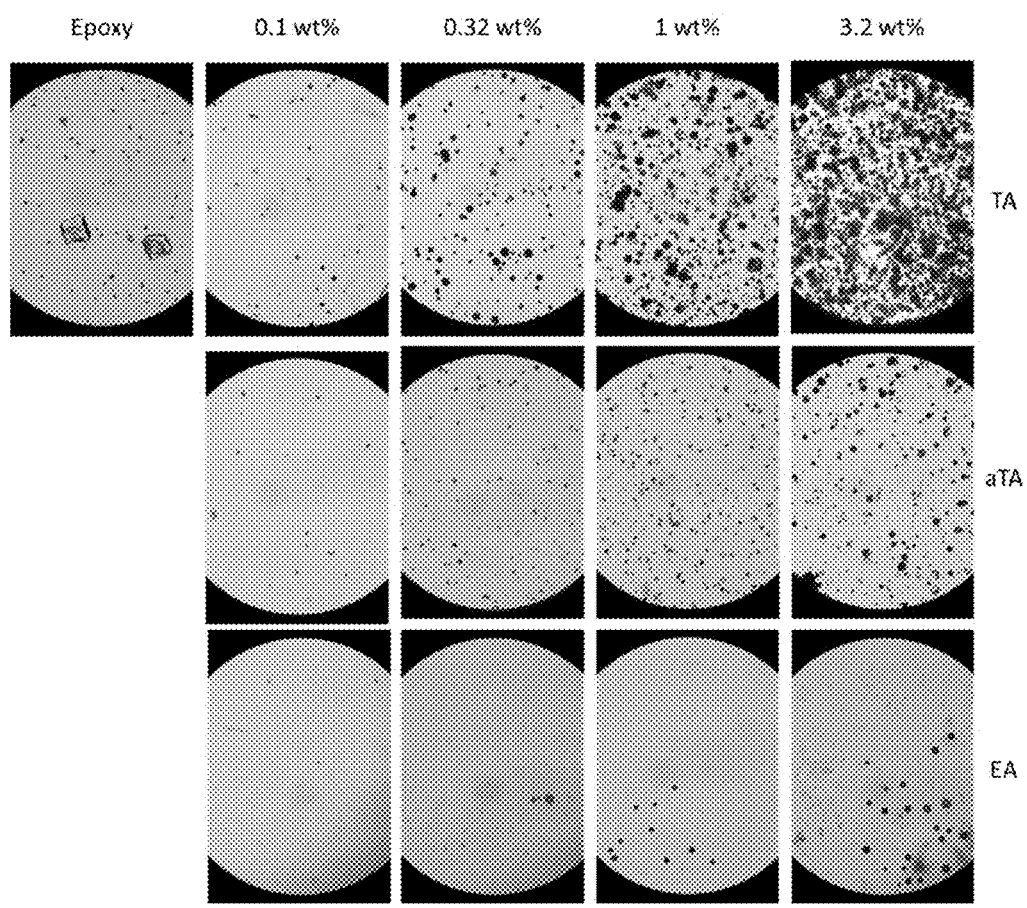
FIG. 4 illustrates Optical microscopy to measure compatibility of powders in epoxy resin (magnification 30×). Results indicate that increased chemical functionalization resulted in increased compatibility.

TA, aTA, and EA were dispersed into epoxy resin at different weight percentages and their compatibility was measured. Samples were analyzed using optical microscopy (FIG. 4).

Samples were found to increase in overall "brown-ness" and opacity as TA loading was increased. While TA did not fully disperse in any of the samples, large clumping was most obviously present to the eye at and above 1 wt % TA in epoxy. aTA samples were found to have increased compatibility as compared to the TA samples, however clumping was observed in the 3.2 wt % sample though the aggregates were significantly smaller in size. EA samples did not have any significant signs of aggregation regardless of loading level; however, all samples were found to be browned as compared to the control resin. Overall, EA samples had the highest degree of compatibility in epoxy, and the compatibility increase was proportional to the amount of acetylation suggested by FTIR.

Figure 5:
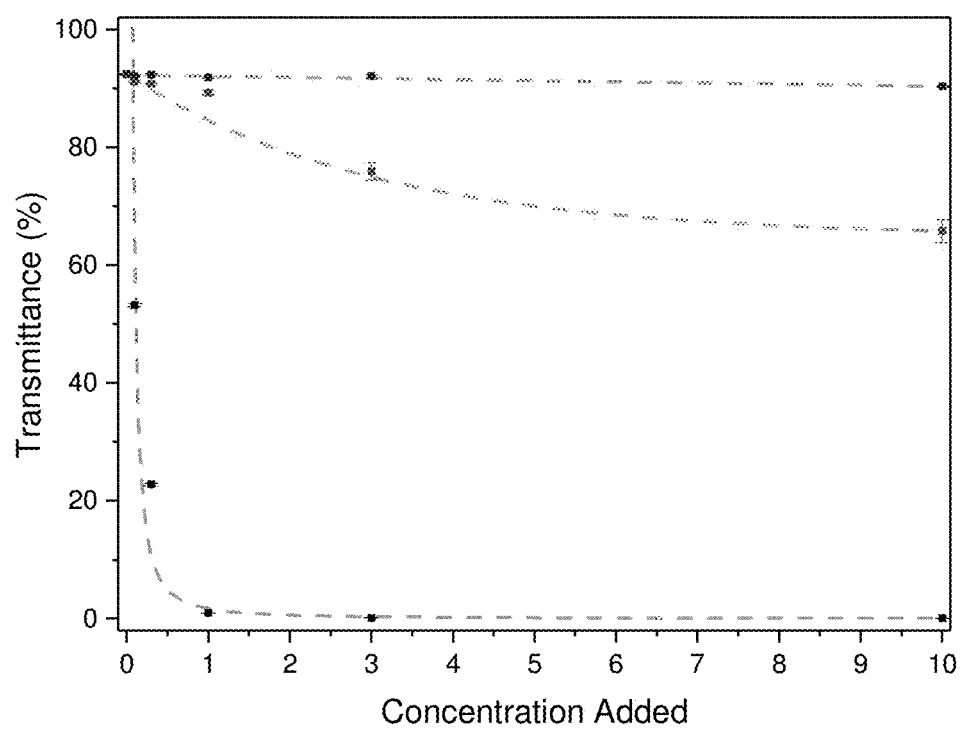
FIG. 5 illustrates Average transmittance data for samples containing FR additives. Trendlines added to help make trends clearer.

The compatibility of the samples was quantified using UV-Vis spectroscopy (FIG. 5). The results from UV-Vis data showed that TA samples showed significant decreases in transmittance with any addition of TA to the solution to near 0% with the addition of 1 wt % TA. Greater than 1 wt % TA, little change in compatibility was observed between samples loaded up to 10 wt %. The aTA samples showed decreased transmittance with addition, though the change was not quite as drastic as what was seen in TA samples. EA samples showed no significant change in transmittance with addition of the powder to the resin, and this trend was found up to 10 wt %.

UV-vis spectroscopy and optical microscopy indicated that the solubility limit of TA in epoxy resin was below 1 wt %. As acetylation of the molecule was increased, the compatibility in epoxy increased. aTA samples showed signs of aggregation in epoxy at a comparable weight percent, but the size of these aggregates was significantly decreased. EA samples did not show significant signs of aggregation regardless of the loading level of to 10 wt %. The results indicated that degree of acetylation of TA resulted in an increase in compatibility, and the compatibility was tunable based on the degree of acetylation.

Thermal/Thermomechanical Stability

Figure 6:
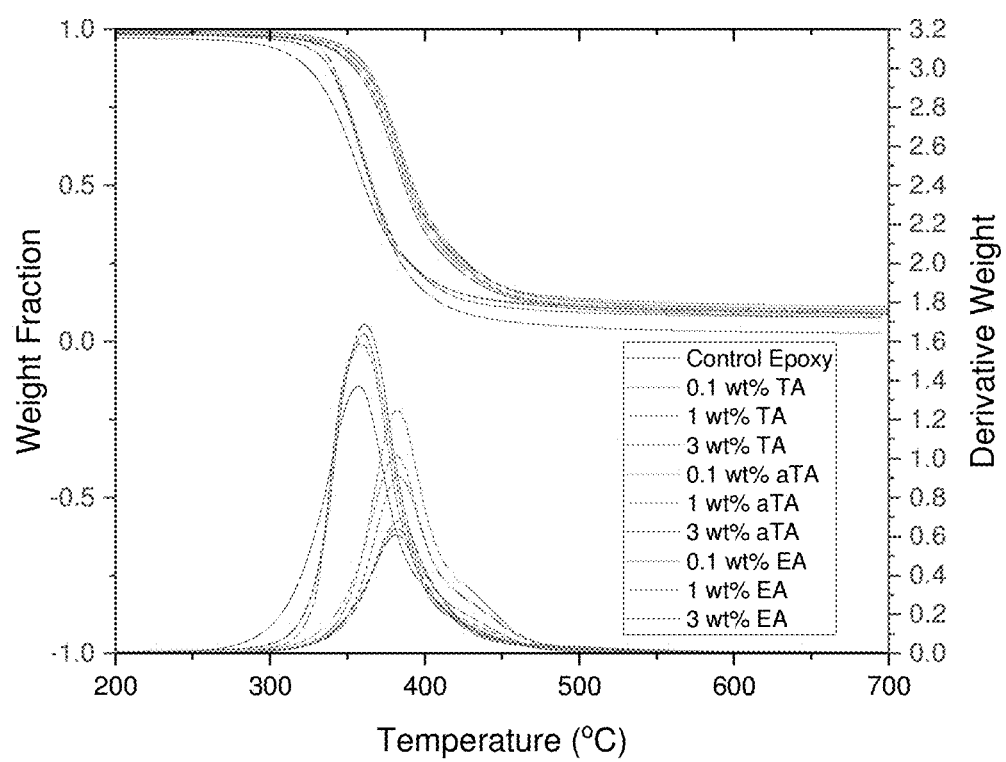
FIG. 6 illustrates TGA of TA, aTA, and EA samples in epoxy in nitrogen. Results indicate all aTA and EA samples had increased thermal stability as compared to control samples. Additionally, all samples formed a stable char at elevated temperature.

In order to get a better understanding of the thermal stability of the samples, thermogravimetric analysis (TGA) was performed (FIG. 6). The results indicated that unmodified TA in epoxy showed increased thermal stability in the 0.1, 0.32, and 1 wt. % TA samples but a downward trend in thermal stability past that loading level. The addition of any amount of acetylation of the molecule resulted in a marked, visible increase in the temperature of initiation of thermal degradation and the temperature of the maximum of the derivative weight curve by approximately 50° C. in either case. The addition of aTA and EA samples at or past the 1 wt % loading level resulted in a notch on the derivative weight curve at approximately 430° C. These results suggest that the resulting char of acetylated TA samples was more thermally stable in nitrogen than the control or TA samples.

Figure 7:
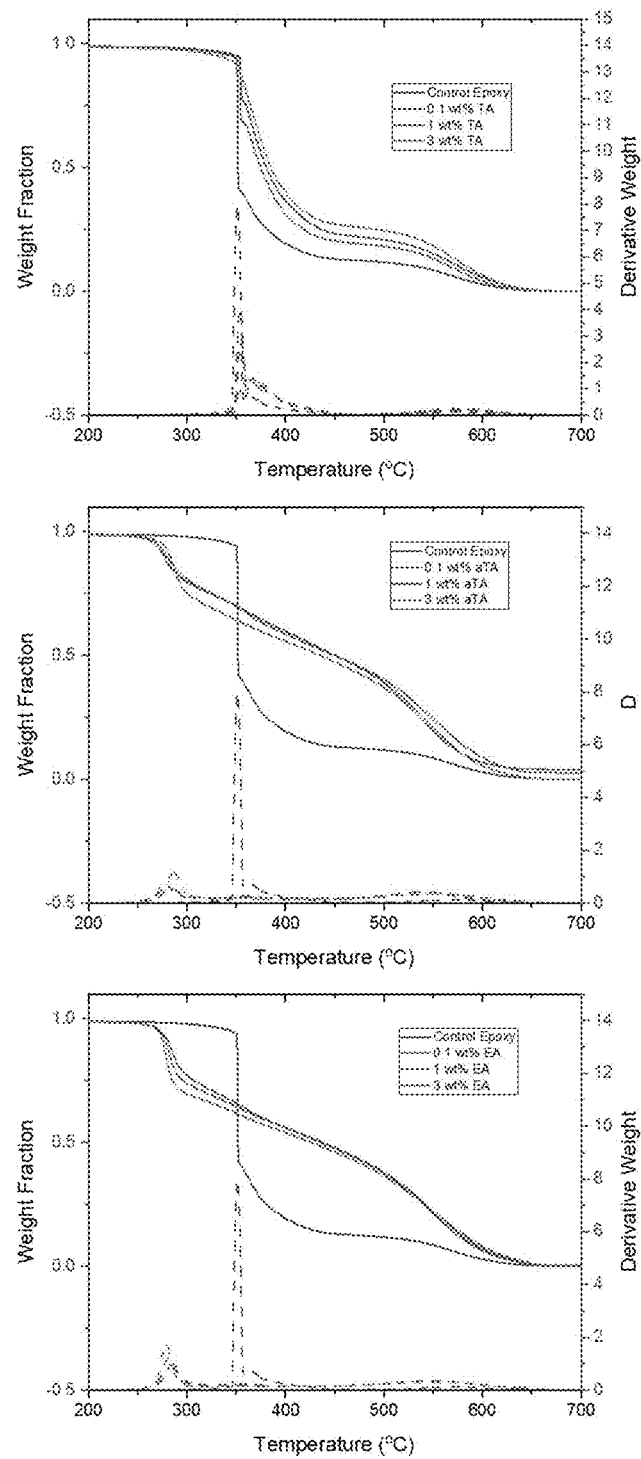
FIG. 7 illustrates Thermogravimetric Analysis of Samples in Compressed Air. Results from this test indicate that TA samples are medicated by the degradation of epoxy whereas aTA and EA samples degrade with the powders and then form a more stable char.

Samples were additionally characterized by TGA with compressed air to help better anticipate the flame-retardant behavior of the samples (FIG. 7). Thermal degradation in compressed air indicated that TA samples, regardless of loading level, did not significantly change the thermal degradation temperatures of the samples. However, with increased TA loading, the amount of char remaining at 500° C. increased. This indicated that the presence of TA in the samples increased the thermal stability of the resulting char, a behavior seen for TA previously for other materials in the literature. The TA-containing samples did not thermally degrade at the temperature associated with TA molecular degradation. Instead, all samples showed indication of thermal degradation at the temperature of the epoxy thermoset, but the amount of char remaining at 500° C. was dependent on the TA loading, as increased TA loading resulted in more char.

These results suggest that the degradation of the thermoset network, and not TA itself, is what initiates thermal degradation of the composite material in TA-epoxy composites. Unmodified TA has been found to crosslink into epoxy thermosets at temperatures above 100° C. (cite). The resulting crosslinked TA-epoxy material traditionally shows thermal degradation at around 525° C., which was not found in the material for this study. In this present study, the thermoset was crosslinked with TETA at room temperature. After this, the resulting thermoset is further cured at 100° C. and 125° C. for 1 and 2 hours respectively. During this post-cure, the TA additives could crosslink into the system with any remaining unreacted epoxy groups. The results from this study indicate that TA does crosslink into the system but does not fully crosslink into the system. This is expected because the amine gets the first chance to react at room temperature resulting in less availability for TA to crosslink into the system. For this reason, TA molecule is chemically bound to the network itself resulting in a material that is epoxy-thermoset dependent for thermal degradation, as indicated by TGA in both nitrogen and air. TA has been found to significantly increase char yield when used as an additive for a variety of polymer matrices. The reason for this behavior is believed to be because of the high density of phenyl groups within the molecule which are able to form a dense, highly-thermally stable char. This result was observed for all TA-containing samples. As TA loading was increased the ability for the material to char increased as well. The preliminary explanation for this behavior is that more TA in the sample results in more phenyl groups. The crosslinked char then thermally degrades at approximately 575° C. regardless of TA loading level.

Chemically modified (aTA and EA) samples had a significantly altered thermal degradation pathway as evidenced by TGA in both nitrogen and compressed air. EA and aTA samples showed thermal degradation at 275° C. which resulted in a char that was more thermally stable than the control epoxy sample. This thermal degradation peak was not significantly different than the peak associated with the aTA and EA powders themselves. The samples then thermally degrade at 575° C. as in the control and TA samples. aTA and EA samples did not show signs of thermal degradation at the 350° C. peak, which was associated with the thermal degradation of the thermoset network. The aTA samples showed increased char yield as compared to the EA samples.

This result in thermal degradation suggested that the initiation of the thermal degradation pathway for aTA and EA samples is dependent upon the aTA and EA in the sample and not the thermal stability of the thermoset network. The degradation of the acetyl functionality in the molecule initiates thermal degradation of the composite material. This could be because the acetyl groups on the TA molecule are cleaved which are then able to initiate the thermal degradation of the thermoset network at lower temperature. However, although the decrease in mass at this temperature is significantly less than the control or just TA-containing samples, the resulting char from this process is more thermally stable resulting in increased mass of samples past the temperature of thermal degradation. The resulting char from this process to the same temperature as the char in the control samples.

This degradation pathway in compressed air could indicate that acetylated TAs could increase the flame retardancy of the system. This is evidenced by a few aspects of the thermal degradation. Firstly, the additive when acetylated initiates material degradation at a lower temperature than the control thermoset which means the response time to char formation at the initiation of a fire is quicker. As the char is the main method through which the molecule can act as a flame retardant, the quicker this is formed the faster the fire can be cut off from its fuel. Secondly, the acetylated additives cause less of the material to degrade in the fire thereby reducing the amount of fuel, in the form of reactive oxidative species, made available to the flame front. Thirdly, the thermal degradation of these acetylated additives results in more volume of the thermally stable char which can form a thermally stable barrier between the flame front and the bulk material. The reaction time, reduction in loss of material, and char volume could synergistically increase the flame retardancy of the overall epoxy thermoset. While response time is consistent between aTA and EA samples, results suggest that aTA samples can produce more char than EA samples on average. For this reason, it is expected that the flame retardant ability would be higher for aTA than EA samples.

Thermomechanical Analysis

Figure 8:
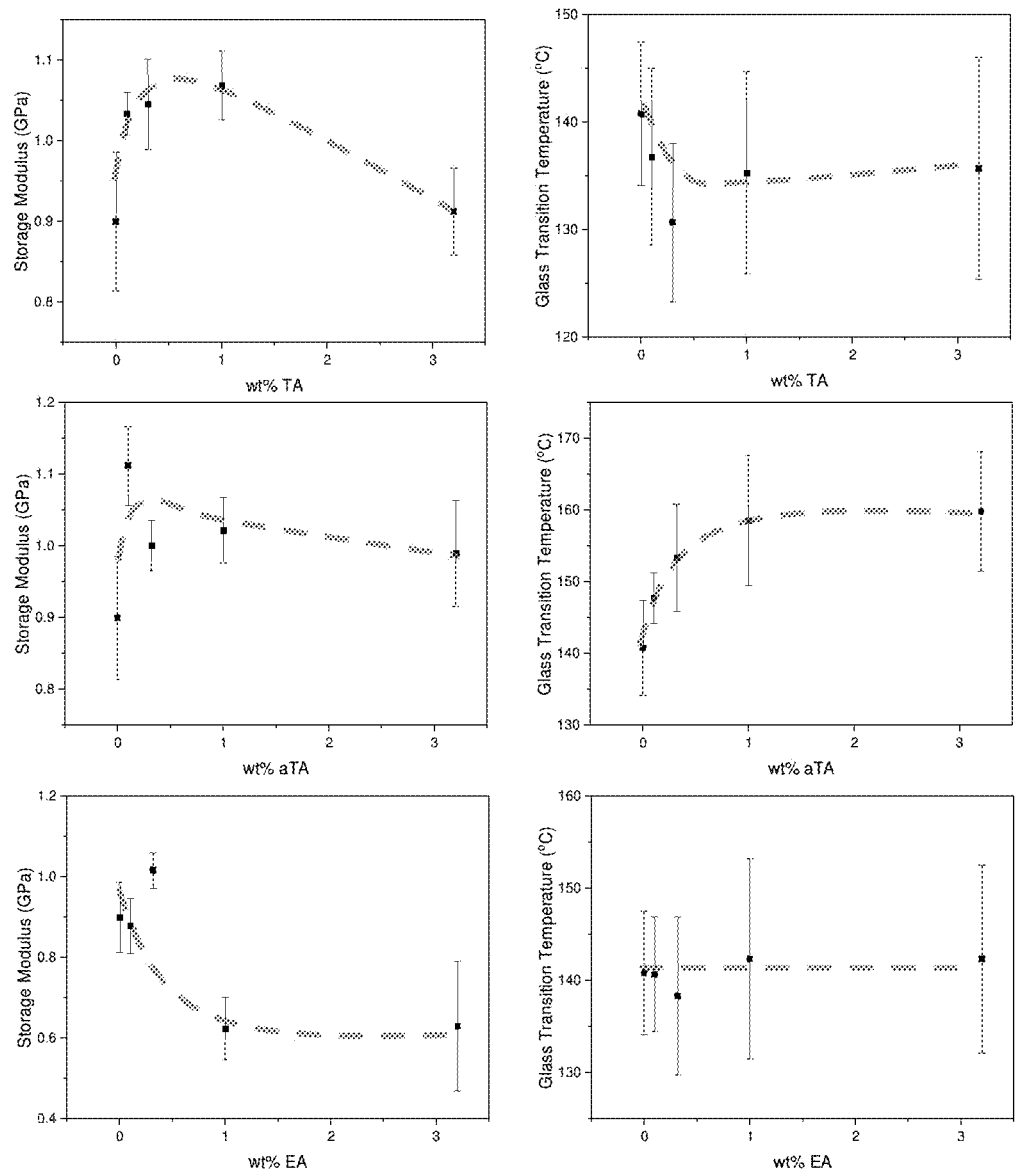
FIG. 8 illustrates dynamic mechanical analysis of samples. Lines were added to aid the eye.

Thermomechanical analysis of samples was performed to study how the compatibility change of the powders in the resin affected the crosslinking density and the glass transition temperature of the thermosets (FIG. 8). Samples containing TA powder showed initial increase in the crosslinking density and storage modulus at room temperature but past the compatibility limitations the solutions were found to decrease overall. There were no significant changes to the glass transition temperatures of the thermosets regardless of TA loading level. Thermosets containing aTA powder were found to have an increase in the glass transition temperature in the 0.1 and 1% aTA samples, but no changes in the 0.32 and 3% samples. Glass transition temperature was found to also increase with aTA addition. EA samples showed a general downward trend in crosslinking density and storage modulus, with a decrease being observed in samples loaded past 0.32%. Glass transition temperature was not found to significantly change with EA addition.

Results show that the compatibility of the powders in epoxy and the thermomechanical properties trended similarly in the case of TA. Because of the limited compatibility of TA and resin, in order to minimize the surface energy of the system the molecules separate into distinct phases, ones that appear on optical microscopy as brown-ish agglomerations that are TA-, aTA- or EA-rich, and more continuous ones that are translucent and epoxy-rich. In the TA-rich phases, there is likely a very small amount of epoxy resin that is able to dissolve. Because there is expected to be very little epoxy resin in this phase, it is likely that the crosslink density is significantly lower in this phase of the material. While it is anticipated that TA could be crosslinking into the epoxy thermoset system, the apparent decrease in global material crosslink density from DMA suggests that this reaction is not able to affect the thermomechanical properties of the composite system. However, in the epoxy-rich phases, the samples have the highest, local crosslink density due to the proximity of epoxy resin and hardener. It is likely that there is TA in these epoxy-rich phases as TA does have limited compatibility in epoxy (<1 wt %). At the temperature of thermosetting, the precursor units (resin and hardener) can react and form the thermoset polymer. The increase in apparent global crosslinking density reported by the DMA suggests that these molecules are crosslinking into the network, thereby increasing the average global crosslinking density but not changing the average global glass transition temperature. Above the compatibility limit the agglomerations formed are large compared to the size of the individual TA molecule and decrease the global average crosslink density as compared to the 0.1 wt % sample. Interestingly, the presence of agglomerations did not significantly change the global crosslinking density of the TA-epoxy composites as compared to the control sample at the loading levels explored for this study. In the samples containing agglomerations, it is likely that the TA in the epoxy phase is crosslinking into the network as seen in the 0.1-1 wt % TA samples. However, this crosslinking is not enough to counteract the decrease in mechanical properties created by the TA-rich phases. These results suggest that if compatibility limitations can be circumvented the resulting material may have increased thermomechanical stability.

In the aTA samples, while 0.1 wt % samples showed a significant increase in the crosslink density and storage modulus, this result did not maintain for concentrations past this point. However, the $T_g$ was found to increase significantly for samples in which 1 wt % or higher of the additive was loaded. The initial explanation for this behavior is that aTA, which is partially modified with acetic anhydride, is able to crosslink into the epoxy system as suggested by previous work. However, this crosslinking density, which should be decreased as compared to TA samples, is either 1) not able to offset the decrease in crosslink density caused by the phase separation within the system at the higher loading levels and/or 2) the crosslinking density as a molecule is not significantly increased as compared to TETA, which is the case for unmodified TA. The EA samples loaded at 1 wt % or higher showed a significant reduction in the crosslink density and storage modulus at room temperature, but no significant change in the $T_g$. This could be the result of TA being unable to crosslink into the system as it is maximally surface functionalized. The comparably large acetylated TA molecules could instead occupy space in the system sterically reducing the material's ability to crosslink, but not being comparatively stiffer not reduce its $T_g$. This suggests that the larger polyphenolic EA molecules get in the way of crosslinking resulting in the global average crosslinking density decreasing. This effect does not change the glass transition temperature in the EA-epoxy thermosets because the glass transition temperature is a metric of the thermal motion of the bonds in the thermoset which has not changed in these samples, though their density has changed.

The results of this work also indicate that chemical functionalization to increase compatibility of TA through acetylation of the molecule is a balancing act. Chemical modification increases compatibility but if done too much it can also simultaneously negatively impact the resulting mechanical properties of the thermoset. Increasing compatibility such that the molecule will dissolve in the resin, but not too much to prevent crosslinking is critical.

Flame Retardant Testing

Figure 9:
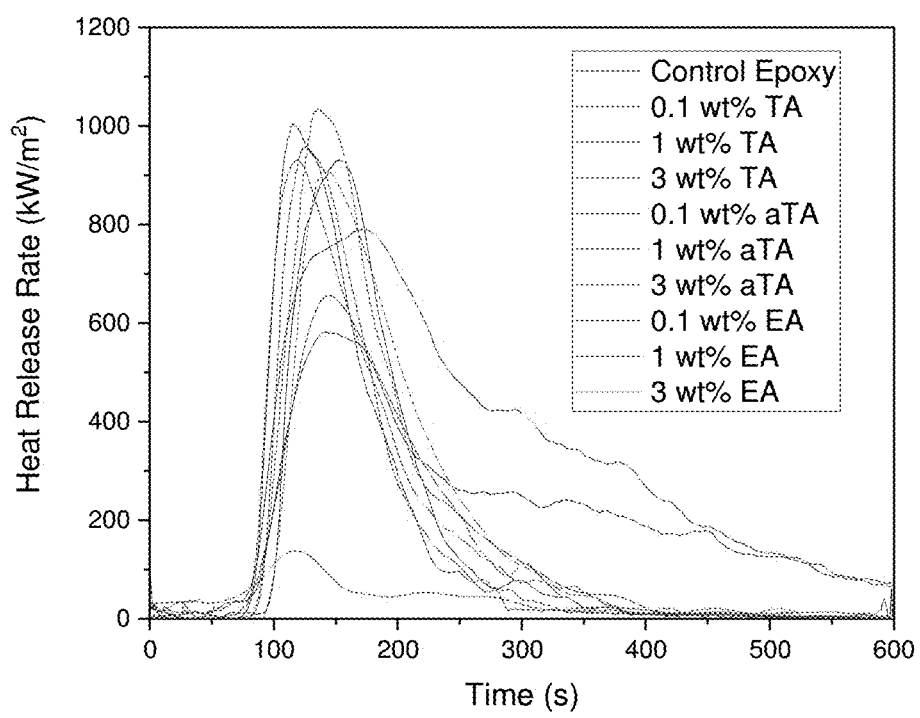
FIG. 9 illustrates MLC of samples indicates that aTA samples showed the most significantly increased flame retardancy. Samples containing 3 wt % of aTA showed the most significant reduction.

Samples were then analyzed by mass loss calorimetry (MLC) to understand their behavior in a fire (Table 2 and FIG. 9). Surprisingly, TA samples were not found to significantly change any of the measured properties of the material in a fire regardless of loading level. However, aTA samples were found to significantly reduce the maximum rate of heat release (RHR) in the 1 wt % and 3 wt % samples, with a nearly 80% reduction in the value at a 3 wt % loading level. Additionally, the 3 wt % aTA samples saw a significant increase to the total mass loss and the peak mass loss rate. EA samples significantly decreased the peak heat release rate, but at 3 wt % EA this trend was not followed. No samples showed significant changes to the TTI.

The results from MLC indicate that aTA samples showed the most promise as a flame retardant additive. This result was suggested by TGA in compressed air, where aTA samples showed the highest concentration of char at elevated temperature. TGA indicated that aTA and EA samples could have a significantly increased sensitivity to temperature increase, but MLC did not indicate this was the case. The reason for this is that the 35 kW heating of the samples in MLC responds to a temperature closer to 600° C., which was significantly above the thermal degradation temperature of TA, aTA, and EA samples. The preliminary explanation for why aTA samples have such significantly better flammability comparatively is due to the residual phenol groups after chemical modification. Leading available phenol groups which could crosslink into the epoxy network during post-cure, along with the surface modification to enhance compatibility and char yield, result in reduced molecular mobility in the epoxy resulting in an increased char yield in the epoxy. This char could act as a barrier between the epoxy and the flame front reducing the fuel to the fire. These results are consistent with the expected behavior from TGA in compressed air and thermomechanical properties from TGA.

Results that had significant reductions in RHR were compared to literature values for 10 wt % of triphenyl phosphate (TPP) in epoxy using this method (Table 3). See Mendis, G.; Weiss, S.; Korey, M.; Boardman, C.; Dietenberger, M.; Youngblood, J.; Howarter, J., Phosphorylated Lignin as a Halogen-Free Flame Retardant Additive for Epoxy Composites. *Green Materials* 2016, 4 (4). Results indicate that the aTA samples reduce the peak RHR by 79% on average whereas the TPP controls only reduced the peak by 43%. This result suggests that aTA samples may have a better flame retardant response as compared to the TPP controls. Since TPP is available and utilized commercially, this may indicate that aTA samples could out-perform commercially available epoxy flame retardants.

TABLE 3

The peak RHR percent reduction for samples with significant differences from the control.

| Sample | Percent Reduction of Peak RHR (%) |
| --- | --- |
| Control Epoxy | 0% |
| 1 wt % aTA | 46% |
| 3 wt % aTA | 79% |
| 0.1 wt % EA | 26% |

TABLE 2

MLC Results from Samples.

| | Time to Ignition (s) | Total Mass Loss (g) | Peak Mass Loss Rate (g/min) | Peak Rate of Heat Release (RHR) (kW/m$^2$) | Total Heat Release (MJ) |
| --- | --- | --- | --- | --- | --- |
| Control Epoxy | 91.6 ± 14.9 | 30.3 ± 2.6 | 43.6 ± 6.5 | 954.5 ± 111.1 | 86.4 ± 4.4 |
| 0.1 wt % TA | 99 ± 3.7 | 34.3 ± 3.9 | 47.8 ± 4.5 | 1004.8 ± 34.7 | 93.9 ± 8.6 |
| 1 wt % TA | 92 ± 11.2 | 33.5 ± 1.9 | 47.7 ± 4.1 | 1021.2 ± 28.4 | 93.3 ± 5.5 |
| 3.2 wt % TA | 94.7 ± 2.4 | 33.9 ± 1.4 | 48.3 ± 2.7 | 1050.1 ± 12.1 | 99.2 ± 2.2 |
| 0.1 wt % aTA | 113 ± 14.7 | 36.6 ± 3.7 | 40.9 ± 4.1 | 896.6 ± 107.6 | 125.3 ± 5.0 |
| 1 wt % aTA | 82 ± 22.5 | 34 ± 10 | 35.6 ± 6.5 | 511.9 ± 199.3\* | 72 ± 30.6 |
| 3.2 wt % aTA | 82 ± 7.0 | 23.6 ± 1.9\* | 30.6 ± 2.3\* | 199.9 ± 37.9\* | 17.4 ± 1.6\* |
| 0.1 wt % EA | 86.3 ± 18.3 | 34.9 ± 8.8 | 40 ± 3.0 | 709.9 ± 54.9\* | 94.2 ± 23.4 |
| 1 wt % EA | 76.3 ± 12.7 | 36.2 ± 4.2 | 40.6 ± 8.3 | 666.2 ± 151.8\* | 95.9 ± 9.5 |
| 3 wt % EA | 99.7 ± 14.4 | 32.3 ± 4.0 | 49.4 ± 6.1 | 943.3 ± 35.5 | 109.8 ± 12.9 |

Samples in bold with asterisks indicate they are significantly different form the control samples (p < 0.05)

TABLE 3-continued

The peak RHR percent reduction for samples with significant differences from the control.

| Sample | Percent Reduction of Peak RHR (%) |
| --- | --- |
| 1 wt % EA | 30% |
| 10 wt % TPP | 43% |

Samples with 3 wt % aTA showed a reduction of 79% whereas TPP controls reduced the peak RHR by 43%.

In this work, biologically-based and non-toxic TA was acetylated to increase compatibility in epoxy and studied as an alternative flame retardant for these thermosets. The results from this work showed that the degree of acetylation of the molecule had a significant impact on the ability for the molecule to work as a flame retardant and on its thermomechanical properties. Higher acetylation of TA resulted in a reduction of the flame retardant ability at higher loading levels due to the inability for the molecule to crosslink with the thermoset. Samples that were partially acetylated showed a significant reduction in PHR, MLR, and THR which was largely attributed to the presence of residual phenol groups. The result from this work shows that through partial acetylation the flame retardancy of TA can be enhanced significantly. It is the hope of the researchers that this work could be used to decrease the environmental and health impacts of the use of epoxy thermosets around the world.

We claim:

1. A flame retardant resin, wherein the resin is a reaction product of an epoxy material, a curing agent, and a partially esterified tannic acid of formula I,

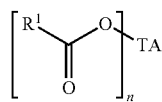

I wherein TA represents a tannic acid moiety, $R^1$ represents an optionally substituted $C_1$-$C_6$ straight or branched alkyl, an optionally substituted $C_3$-$C_6$ cyclic ring, an optionally substituted phenyl group, or any combination thereof, n is 2-10; and wherein the partially esterified tannic acid refers to that about 8-40% of free hydroxy groups on the phenolic ring of the tannic acid (TA) are esterified.

2. The flame retardant resin of claim 1, wherein $R^1$ is methyl group or a phenyl group.

3. The flame retardant resin of claim 1, wherein the epoxy material comprises bisphenol A based epoxy material, bisphenol F based epoxy material, cycloaliphatic epoxy material, novolac epoxy material, or any combination thereof.

4. The flame retardant resin of claim 1, wherein the curing agent comprise polyamine, aliphatic amine, polyamide, cycloaliphatic amine, aromatic amine, anhydride, imidazole, Lewis acid, or a combination thereof.

5. The flame retardant resin of claim 1, wherein the partially esterified tannic acid has at least 3 wt % of the total weight of the epoxy material and the partially esterified tannic acid of formula I.

6. The flame retardant resin of claim 1, wherein the partially esterified tannic acid has 3-10 wt % of the total weight of the epoxy material and the partially esterified tannic acid of formula I.

7. The flame retardant resin of claim 1, wherein n is 3-8.

8. The flame retardant resin of claim 1, wherein n is 5-6.

9. A method of using a partially esterified tannic acid as a flame retardant additive in preparing a flame retardant resin, wherein the method comprises:

providing a partially esterified tannic acid of formula I;

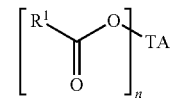

I providing an epoxy material;

mixing the partially esterified tannic acid and the epoxy material; and curing the mixture of the partially esterified tannic acid and the epoxy material with a curing agent to provide a flame retardant resin;

wherein TA represents a tannic acid moiety, $R^1$ represents an optionally substituted $C_1$-$C_6$ straight or branched alkyl, an optionally substituted $C_3$-$C_6$ cyclic ring, an optionally substituted phenyl group, or any combination thereof, n is 2-10; and wherein the partially esterified tannic acid refers to that about 8-40% of free hydroxy groups on the phenolic ring of the tannic acid (TA) are esterified.

* * * * *